(12) United States Patent
Liang et al.

(10) Patent No.: US 12,571,966 B2
(45) Date of Patent: Mar. 10, 2026

(54) SPOT-SIZE CONVERTER AND PHOTONIC DEVICE

(71) Applicant: NANJING LYCORE TECHNOLOGIES CO., LTD., Nanjing (CN)

(72) Inventors: Hanxiao Liang, Nanjing (CN); Yipin Song, Nanjing (CN); Yingcong Zhou, Nanjing (CN); Haicang Wu, Nanjing (CN); Wenhao Mao, Nanjing (CN); Shiwei Song, Nanjing (CN); Weiqi Sun, Nanjing (CN); Qingyang Yu, Nanjing (CN)

(73) Assignee: NANJING LYCORE TECHNOLOGIES CO., LTD., Nanjing (CN)

( * ) Notice: Subject to any disclaimer, the term of this patent is extended or adjusted under 35 U.S.C. 154(b) by 267 days.

(21) Appl. No.: 18/556,732

(22) PCT Filed: Feb. 24, 2022

(86) PCT No.: PCT/CN2022/077649
§ 371 (c)(1),
(2) Date: Oct. 23, 2023

(87) PCT Pub. No.: WO2022/222599
PCT Pub. Date: Oct. 27, 2022

(65) Prior Publication Data
US 2024/0210629 A1 Jun. 27, 2024

(30) Foreign Application Priority Data
Apr. 23, 2021 (CN) .......................... 202110440944.0

(51) Int. Cl.
G02B 6/30 (2006.01)
G02B 6/34 (2006.01)

(52) U.S. Cl.
CPC .............. *G02B 6/305* (2013.01); *G02B 6/34* (2013.01)

(58) Field of Classification Search
None
See application file for complete search history.

(56) References Cited

U.S. PATENT DOCUMENTS 6,310,995 B1 10/2001 Saini et al.
6,768,855 B1 * 7/2004 Bakke .................. G02B 6/1228
385/129

(Continued)

FOREIGN PATENT DOCUMENTS

CN 1261675 8/2000
CN 1589415 3/2005

(Continued)

OTHER PUBLICATIONS

Extended European Search Report in European Appln. No. 22790709. 4, mailed on Sep. 4, 2024, 8 pages.

*Primary Examiner* — Jerry Rahll

(74) *Attorney, Agent, or Firm* — Fish & Richardson P.C.

(57) ABSTRACT

A spot-size converter is provided. The spot-size converter includes a first end face and a second end face, and further includes a substrate, and an isolation layer, a first waveguide and a covering layer which are located on a side of the substrate. The first waveguide includes a flat-plate layer and a ridge layer. The flat-plate layer includes a first wide end extending to the first end face and a first narrow end extending to the second end face or having a distance from the second end face, and the flat-plate layer has a width decreasing in a gradient from the first wide end to the first narrow end and includes a first equal-width portion adjacent to the first narrow end. The ridge layer includes a second (Continued)

wide end extending to the first end face and a second narrow end having a distance from the first narrow end.

20 Claims, 5 Drawing Sheets

(56)                References Cited

U.S. PATENT DOCUMENTS

| | | | | |
|---|---|---|---|---|
| 7,079,727 B1* | 7/2006 | Little | .................... | G02B 6/132 |
| | | | | 385/28 |
| 7,333,689 B2* | 2/2008 | Menon | ................. | H01S 5/1082 |
| | | | | 385/28 |
| 7,643,710 B1* | 1/2010 | Liu | ........................ | B82Y 20/00 |
| | | | | 385/39 |
| 9,460,740 B1* | 10/2016 | Staffaroni | ............ | G02B 6/0013 |
| 10,845,550 B1* | 11/2020 | Efimov | ................ | G02B 6/4215 |
| 12,265,253 B2* | 4/2025 | He | ........................ | G02B 6/305 |
| 2002/0031297 A1* | 3/2002 | Forrest | ................... | B82Y 20/00 |
| | | | | 359/344 |
| 2003/0068152 A1* | 4/2003 | Gunn, III | ............ | G02B 6/1228 |
| | | | | 385/132 |
| 2006/0285797 A1* | 12/2006 | Little | ................... | G02B 6/1228 |
| | | | | 385/28 |
| 2009/0324164 A1* | 12/2009 | Reshotko | ............ | G02B 6/1228 |
| | | | | 257/432 |
| 2014/0199018 A1* | 7/2014 | Sakakibara | .......... | G02B 6/1228 |
| | | | | 385/14 |
| 2015/0086153 A1* | 3/2015 | Ono | ....................... | G02B 6/124 |
| | | | | 385/11 |

| | | | | |
|---|---|---|---|---|
| 2016/0041340 A1* | 2/2016 | Shi | ........................ | G02B 6/1228 |
| | | | | 385/14 |
| 2016/0131836 A1* | 5/2016 | Matsumoto | ........ | G02B 6/29355 |
| | | | | 385/11 |
| 2017/0179679 A1 | 6/2017 | Lee et al. | | |
| 2019/0170944 A1* | 6/2019 | Sodagar | ................. | G02B 6/305 |
| 2020/0257180 A1* | 8/2020 | Mahgerefteh | ......... | G02F 1/2257 |
| 2021/0382232 A1* | 12/2021 | He | ........................... | G02B 6/14 |

FOREIGN PATENT DOCUMENTS

| | | |
|---|---|---|
| CN | 2689539 | 3/2005 |
| CN | 1756009 | 4/2006 |
| CN | 101055338 | 10/2007 |
| CN | 101120273 | 2/2008 |
| CN | 101320111 | 12/2008 |
| CN | 102159975 | 8/2011 |
| CN | 103048733 | 4/2013 |
| CN | 105264414 | 1/2016 |
| CN | 109324372 | 2/2019 |
| CN | 110231719 | 9/2019 |
| CN | 111367014 | 7/2020 |
| CN | 111487715 | 8/2020 |
| CN | 211928243 | 11/2020 |
| CN | 112285829 | 1/2021 |
| CN | 113093333 | 7/2021 |
| JP | 2004-355036 | 12/2004 |
| JP | 2005-043556 | 2/2005 |
| JP | 2012-083446 | 4/2012 |
| WO | WO 2020/172585 | 8/2020 |

* cited by examiner

SPOT-SIZE CONVERTER AND PHOTONIC DEVICE

CROSS-REFERENCE TO RELATED APPLICATION

The present application is a national stage filing under 35 U.S.C. § 371 of International Application No. PCT/CN2022/077649, filed on Feb. 24, 2022, which claims priority to Chinese patent application No. 202110440944.0, filed on Apr. 23, 2021. The contents of these applications are incorporated herein by reference in their entirety.

TECHNICAL FIELD

The present disclosure relates to the technical field of photons, and in particular, to a spot-size converter and a photonic device.

BACKGROUND

An optical waveguide is a dielectric apparatus that guides the propagation of light waves therein, and is also referred to as a dielectric optical waveguide. There are mainly two types of optical waveguides: one type is integrated optical waveguides, comprising a planar dielectric optical waveguide and a slab dielectric optical waveguide, which generally serve as a part of an optoelectronic integrated device, so they are referred to as integrated optical waveguides; and the other type is cylindrical optical waveguides, which are usually referred to as optical fibers.

A technology of coupling the integrated optical waveguide to the optical fiber has very wide and important applications in the fields of optical communications, microwave photonics, laser beam deflection, wavefront modulation, etc. Edge coupling is a common way used to couple the integrated optical waveguide to the optical fiber.

However, how to improve the coupling efficiency between the integrated optical waveguide and the optical fiber has always been an important topic under research for those skilled in the art because of the great difference in spot size between the integrated optical waveguide and the optical fiber.

SUMMARY

According to one aspect of the present disclosure, a spot-size converter is provided, comprising a first end face configured to be coupled to an integrated optical waveguide, and a second end face parallel to the first end face and configured to be coupled to an optical fiber. The spot-size converter comprises:

a substrate;

an isolation layer located on a side of the substrate, and having an orthographic projection on the substrate that substantially coincides with the substrate;

a first waveguide located on a side of the isolation layer away from the substrate, and comprising:

a flat-plate layer comprising a first wide end extending to the first end face and a first narrow end extending to the second end face or having a distance from the second end face, the flat-plate layer having a width which decreases in a gradient from the first wide end to the first narrow end and comprising a first equal-width portion adjacent to the first narrow end, wherein a width direction is parallel to the substrate and parallel to the first end face; and a ridge layer stacked on a side of the flat-plate layer away from the substrate, the ridge layer comprising a second wide end extending to the first end face and a second narrow end having a distance from the first narrow end, the ridge layer having a width which decreases in a gradient from the second wide end to the second narrow end and comprising a second equal-width portion adjacent to the second narrow end; and a covering layer located on a side of the first waveguide away from the substrate, extending to the second end face, and extending to cover at least an end of the second equal-width portion away from the second end face, wherein a part of the covering layer close to the second end face and a part of the isolation layer close to the second end face form a second waveguide.

According to another aspect of the present disclosure, a photonic device is provided, comprising a spot-size converter according to any one of the foregoing technical solutions.

These and other aspects of the present disclosure will be clear from the embodiments described below, and will be clarified with reference to the embodiments described below.

BRIEF DESCRIPTION OF THE DRAWINGS

More details, features, and advantages of the present disclosure are disclosed in the following description of example embodiments with reference to the accompany drawings, in which.

DETAILED DESCRIPTION

Figure 1A:
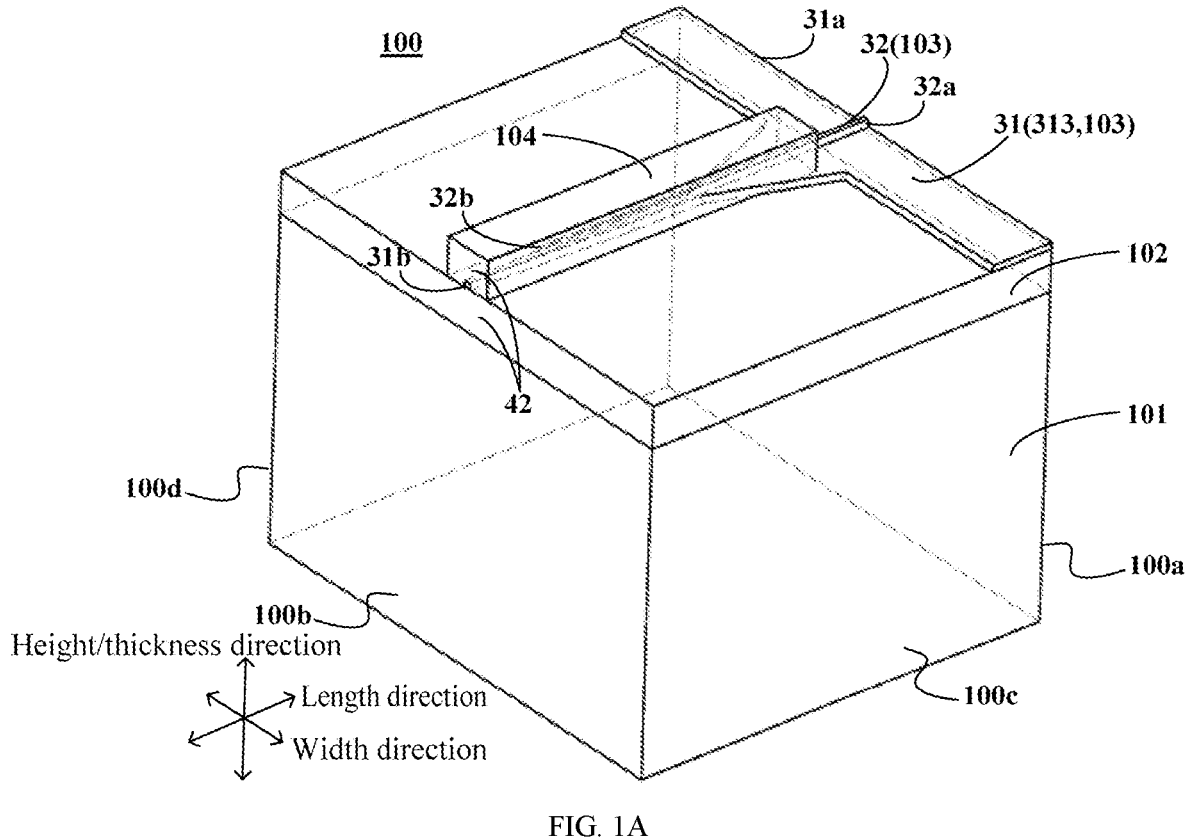
FIG. 1A is a schematic structural perspective view of a spot-size converter according to some example embodiments of the present disclosure.
Figure 1B:
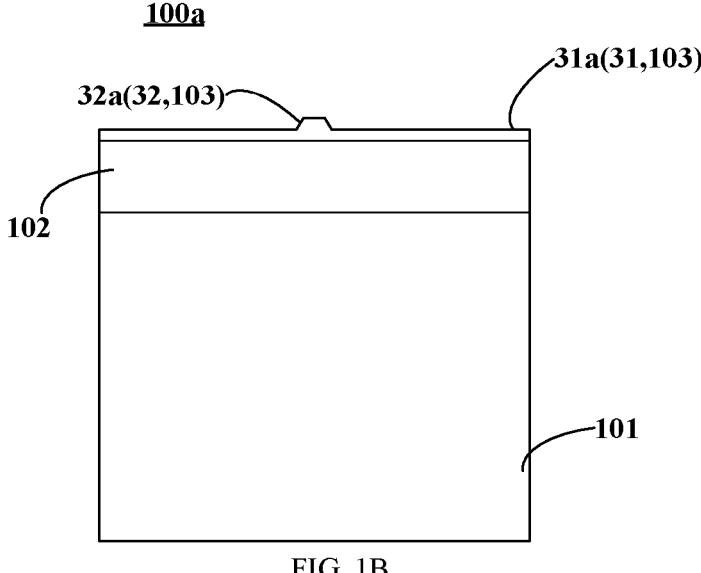
FIG. 1B is a schematic diagram of a first end face of a spot-size converter according to some example embodiments of the present disclosure.

Only some example embodiments are briefly described below. As can be appreciated by those skilled in the art, the described embodiments can be modified in various ways without departing from the spirit or scope of the present disclosure. Accordingly, the accompanying drawings and the description are considered as illustrative in nature, and not as restrictive.

Although spot-size converters in some related technologies can functionally realize the coupling between an integrated optical waveguide and an optical fiber, the coupling efficiency between the integrated optical waveguide and the optical fiber is not high because of the large difference in spot size therebetween, resulting in a high loss of light energy. For example, the spot size of the integrated optical waveguide is generally of the order of hundreds of nanometers, while the spot size of the optical fiber, such as a flat-ended optical fiber, is of the order of tens of microns. Lost light energy may lead to severe heating of a coupling end face, thereby affecting the reliability and service life of a device. It can be understood that the coupling efficiency is a ratio of optical power emitted by the integrated optical waveguide to optical power received by the optical fiber, or a ratio of optical power emitted by the optical fiber to optical power received by the integrated optical waveguide.

Embodiments of the present disclosure provide a spot-size converter and a photonic device, which can not only perform spot size conversion, but also have a low optical loss during the spot size conversion, so that the coupling efficiency between an integrated optical waveguide and an optical fiber can be improved.

As shown in FIGS. 1A, 1B, 1C, 2A and 2B, a spot-size converter 100 according to some embodiments of the present disclosure comprises a first end face 100a configured to be coupled to an integrated optical waveguide (not shown) and a second end face 100b parallel to the first end face 100a and configured to be coupled to an optical fiber (not shown). The spot-size converter 100 structurally comprises a substrate 101, and an isolation layer 102, a first waveguide 103 and a covering layer 104 which are located on a side of the substrate 101 and are sequentially arranged in a direction away from the substrate 101.

An orthographic projection of the isolation layer 102 on the substrate 101 substantially coincides with the substrate 101. The first waveguide 103 comprises a flat-plate layer 31 and a ridge layer 32 stacked on a side of the flat-plate layer 31 away from the substrate 101. The flat-plate layer 31 comprises a first wide end 31a extending to the first end face 100a and a first narrow end 31b extending to the second end face 100b. The flat-plate layer 31 has a width decreasing in a gradient from the first wide end 31a to the first narrow end 31b and comprises a first equal-width portion 311 adjacent to the first narrow end 31b. The ridge layer 32 comprises a second wide end 32a extending to the first end face 100a, and a second narrow end 32b having a distance from the first narrow end 31b. The ridge layer 32 has a width decreasing in a gradient from the second wide end 32a to the second narrow end 32b and comprises a second equal-width portion 321 adjacent to the second narrow end 32b. The covering layer 104 extends to the second end face 100b, and extends to cover at least an end of the second equal-width portion 321 away from the second end face 100b. A part of the covering layer 104 close to the second end face 100b and a part of the isolation layer 102 close to the second end face 100b jointly form a second waveguide 42.

As shown in FIG. 1A, in addition to comprising the first end face 100a and the second end face 100b, the spot-size converter 100 further comprises a first side surface 100c and a second side surface 100d which are arranged in parallel to each other and orthogonal to the first end face 100a and the second end face 100b. The first end face 100a is configured to be coupled to the integrated optical waveguide, and the second end face 100b is configured to be coupled to the optical fiber. It is possible that the first end face 100a is used as an optical input end face of the spot-size converter 100, and the second end face 100b is used as an optical output end face of the spot-size converter 100. Specifically, light is input from the first wide end 31a and the second wide end 32a of the first waveguide 103, and is output from the second waveguide 42. It is also possible that the first end face 100a is used as an optical output end face of the spot-size converter 100, and the second end face 100b is used as an optical input end face of the spot-size converter 100. Specifically, light is input from the second waveguide 42, and is output from the first wide end 31a and the second wide end 32a of the first waveguide 103.

In the embodiments of the present disclosure, it is defined that a width direction is parallel to the substrate 101 and the first end face 100a, a length direction is parallel to the substrate 101 and perpendicular to the first end face 100a, and a height direction and a thickness direction are perpendicular to the substrate 101. For a three-dimensional structure with a certain thickness or height, taking the first equal-width portion 311 as an example, it can be understood that its width is the width of its orthographic projection on the substrate 101, and that its length is the length of its orthographic projection on the substrate 101. By the orthographic projection of the isolation layer 102 on the substrate 101 substantially coinciding with the substrate 101, it can be understood that when viewed from the direction perpendicular to the substrate 101 (for example, in the top view direction), with process errors ignored, it is considered that the contour shapes of the orthographic projection and the substrate are consistent and coincident.

In the embodiments of the present disclosure, a refractive index n1 of the first waveguide 103, a refractive index n2 of the covering layer 104, a refractive index n3 of the isolation layer 102 and a refractive index n4 of the substrate 101 satisfy: n1>n2>n3.

As shown in FIG. 1A, the first waveguide 103 is a ridge waveguide having a series of excellent characteristics such as a low dominant mode cutoff frequency, a wide band, and low impedance. The refractive index of the isolation layer 102 and the refractive index of the covering layer 104 are less than that of the first waveguide 103, so that light can be mainly confined to transmitting in the ridge waveguide to achieve the above advantages of the ridge waveguide. A part of the covering layer 104 close to the second end face 100b and a part of the isolation layer 102 close to the second end face 100b jointly form a second waveguide 42. The size of the second waveguide 42 is greater than that of the first narrow end 31b, and can match the spot size of the optical fiber, thereby improving the coupling to the optical fiber at the second end face 100b.

When the light is transmitted from the first end face 100a to the second end face 100b of the spot-size converter 100, a part of the light escapes from the first equal-width portion 311 into the second waveguide 42, and continues to be transmitted in the second waveguide 42 until the light reaches the second end face 100b, so as to form, at the second end face 100b, a spot size matching that of the optical fiber. On the contrary, when the light is transmitted from the second end face 100b to the first end face 100a of the spot-size converter 100, the light enters the first equal-width portion 311 from the second waveguide 42, that is, the light enters the first waveguide 103 through the second waveguide 42. The refractive index of the substrate 101 is generally greater than that of the isolation layer 102. The substrate 101 is, for example, a silicon substrate.

Figure 2A:
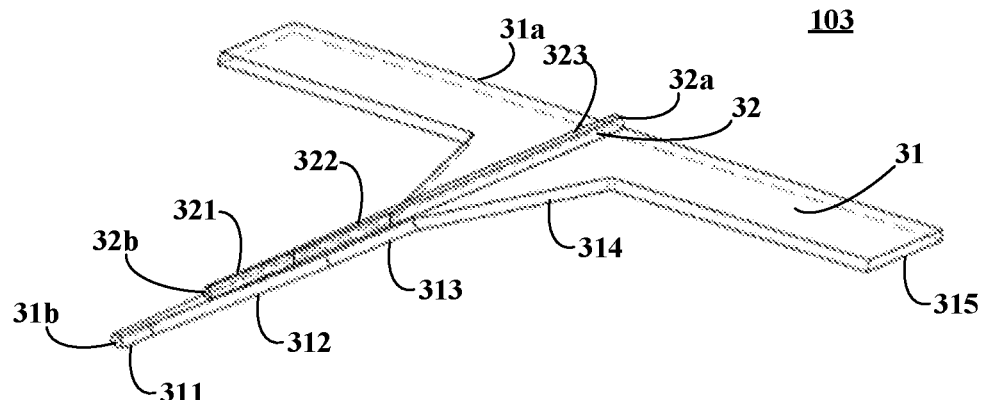
FIG. 2A is a schematic structural perspective view of a first waveguide according to some example embodiments of the present disclosure.
Figure 2B:
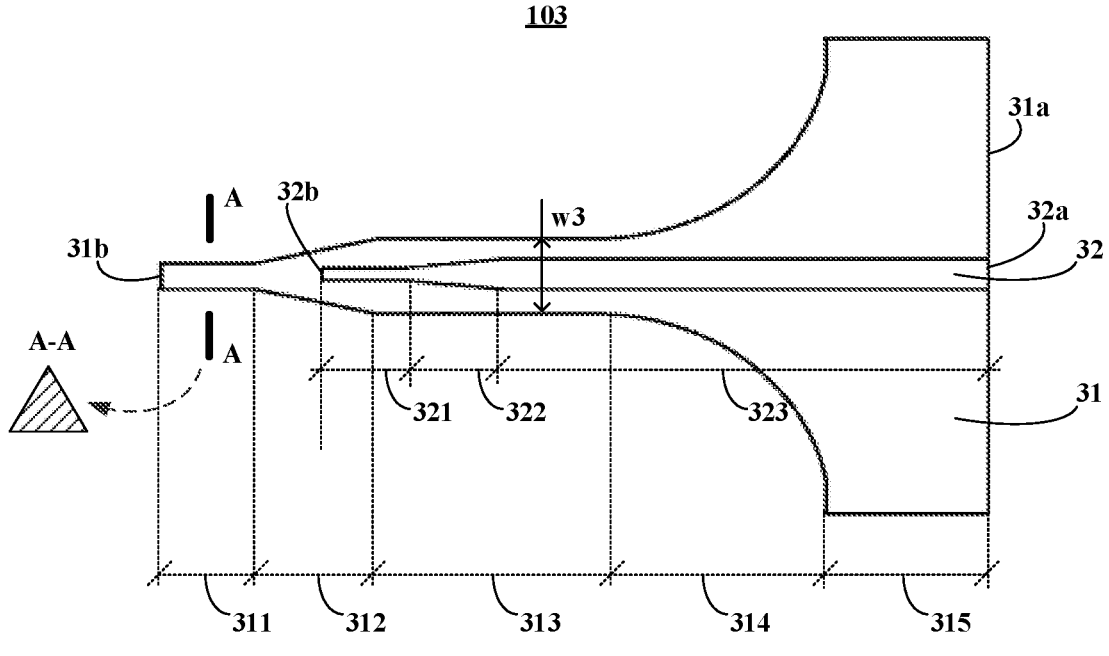
FIG. 2B is a schematic structural top view of a first waveguide according to some example embodiments of the present disclosure.

The specific structural form of the first waveguide 103 is not limited. As shown in FIGS. 2A and 2B, in some embodiments, the first waveguide 103 is of an axisymmetric structure, and a symmetry axis of the first waveguide 103 is perpendicular to the second end face 100b. The flat-plate layer 31 comprises a first equal-width portion 311, a first gradually-widening portion 312, a third equal-width portion 313, a second gradually-widening portion 314 and a fourth equal-width portion 315 which are sequentially arranged in a direction away from the first narrow end 31b. The ridge layer 32 comprises a second equal-width portion 321, a third gradually-widening portion 322 and a fifth equal-width portion 323 which are sequentially arranged in a direction away from the second narrow end 32b. Any one of the first gradually-widening portion 312, the second gradually-widening portion 314 and the third gradually-widening portion 322 has a width gradually increasing in a direction away from the second end face 100b.

It should be noted that the embodiments of the present disclosure are not limited to designing the first waveguide as an axisymmetric structure, and the first waveguide may also be of an asymmetric structure. For example, the flat-plate layer and/or the ridge layer of the first waveguide may also have a gradient change only on a single side.

The flat-plate layer 31 and the ridge layer 32 of the first waveguide 103 each may be formed by one patterning process. For example, the flat-plate layer 31 is first formed by one patterning process, and the ridge layer 32 is formed by another patterning process. Each patterning process may comprise film formation, photoresist coating, exposure, development, etching, photoresist stripping and other procedures. In the exposure procedure, it is necessary to use a mask to block a non-etched area.

The flat-plate layer 31 and the ridge layer 32 of the first waveguide 103 may also be formed by one patterning process comprising two exposures. For example, after film formation and photoresist coating, a film pattern in an area where the first waveguide 103 is located is first formed by one exposure and subsequent procedures, and then a final structure of the flat-plate layer 31 and the ridge layer 32 is formed by another exposure and subsequent procedures.

In the embodiments of the present disclosure, in a direction away from the first end face 100a, the flat-plate layer 31 of the first waveguide 103 has a width decreasing in a gradient, and the ridge layer 32 also has a width decreasing in a gradient. Due to the gradient structure characteristics of the flat-plate layer 31 and the ridge layer 32, relatively moderate spot-size modulation can be performed on the light transmitted in the first waveguide 103, so as to minimize the light transmission loss and improve the coupling efficiency of the spot-size converter 100.

In addition, a certain distance is provided between the second narrow end 32b of the ridge layer 32 and the first narrow end 31b of the flat-plate layer 31 of the first waveguide 103. With this design, the first equal-width portion 311 can perform steady-state spot-size modulation on the light output from the first waveguide 103 (or the light entering the first waveguide 103), facilitating the improvement of the stability of optical transmission; and due to the aforementioned distance, when the flat-plate layer 31 and the ridge layer 32 are manufactured by two patterning processes or one patterning process comprising two exposures, requirements for the alignment accuracy of a mask can be reduced, facilitating the reduction of the difficulty and cost of process control.

In some embodiments of the present disclosure, the first equal-width portion 311 is prismatic and a cross section thereof parallel to the first end face 100a is triangular or trapezoidal, for example, in the shape of an isosceles triangle or an isosceles trapezoid. When light is transmitted from the first end face 100a to the second end face 100b of the spot-size converter 100, this design allows more light to escape from the first equal-width portion 311 into the second waveguide 42. When the light is transmitted from the second end face 100b to the first end face 100a of the spot-size converter 100, the design allows the light to enter the first equal-width portion 311 more easily from the second waveguide 42, that is, more light is allowed to enter the first waveguide 103 through the second waveguide 42. Therefore, the above cross-sectional shape design of the first equal-width portion 311 can further improve the coupling efficiency between the integrated optical waveguide and the optical fiber. In addition, the second equal-width portion 321 may also be prismatic and a cross section thereof parallel to the first end face 100a may also be triangular or trapezoidal, for example, in the shape of an isosceles triangle or an isosceles trapezoid, to allow the light to enter the flat-plate layer 31 more easily from the second equal-width portion 321.

In the embodiments of the present disclosure, in the direction away from the second end face 100b, a width variation trend of the first gradually-widening portion 312 may be linear or nonlinear, a width variation trend of the second gradually-widening portion 314 may be linear or nonlinear, and a width variation trend of the third gradually-widening portion 322 may be linear or nonlinear. As shown in FIG. 2B, in this embodiment, in the direction away from the second end face 100b, the widths of the first gradually-widening portion 312 and the third gradually-widening portion 322 increase linearly and gradually, and the width of the second gradually-widening portion 314 increases non-linearly and gradually.

The linear width variation trend can realize the smooth modulation of the spot size in a shorter distance. The nonlinear width variation trend can realize more moderate and stable modulation of the spot size, and the shape curve of a gradually-changing portion can be flexibly adjusted according to specific requirements to obtain a better adjustment effect.

Figure 1C:
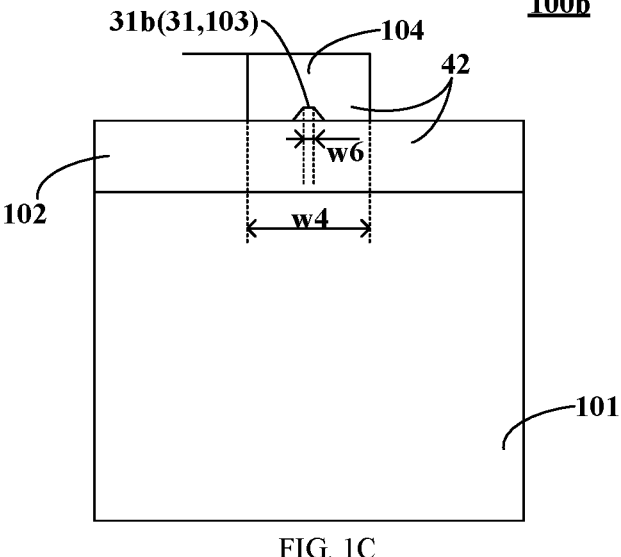
FIG. 1C is a schematic diagram of a second end face of a spot-size converter according to some example embodiments of the present disclosure.
Figure 3:
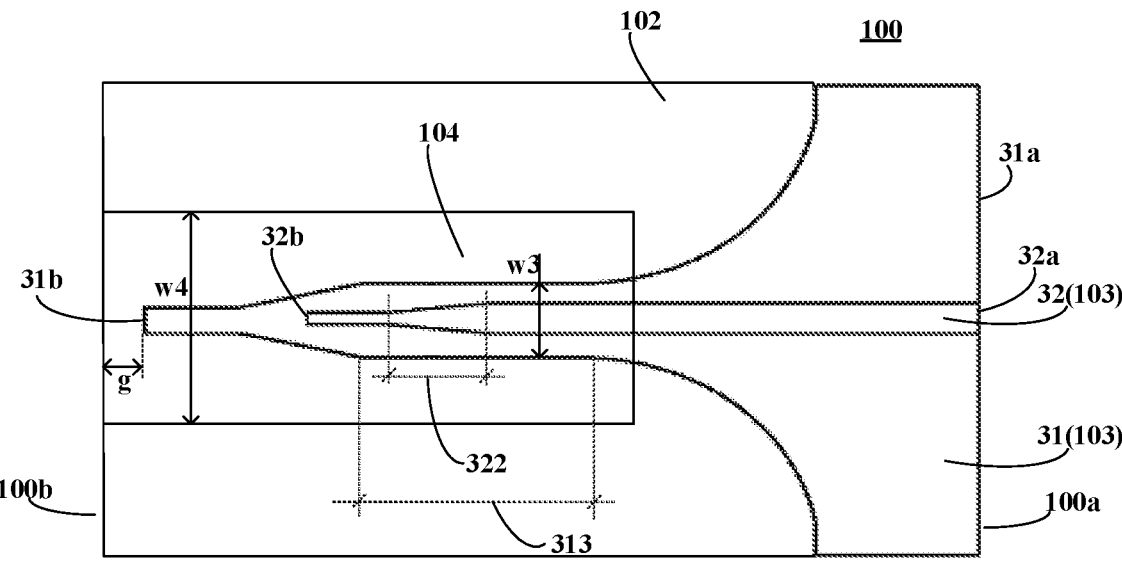
FIG. 3 is a schematic structural top view of a spot-size converter according to some other example embodiments of the present disclosure.

As shown in FIGS. 1A and 1C, in some embodiments of the present disclosure, the first narrow end 31b of the flat-plate layer 31 extends to the second end face 100b. In this way, the first narrow end 31b also serves as a part of a port for outputting to the optical fiber or receiving input from the optical fiber. As shown in FIG. 3, in some other embodiments of the present disclosure, there may also be a distance g between the first narrow end 31b of the flat-plate layer 31 and the second end face 100b, so that an end of the isolation layer 102 and an end of the covering layer 104 that extend to the second end face 100b serve as ports for outputting to the optical fiber or receiving inputs from the optical fiber.

As shown in FIGS. 1A and 2A, the fourth equal-width portion 315 of the flat-plate layer 31 may also extend to the first side surface 100c and the second side surface 100d, that is, the width of the fourth equal-width portion 315 is maximized. In this way, the spot-size converter 100 can be adapted to an integrated optical waveguide with a larger spot size, thereby improving the applicability of the spot-size converter 100.

In some embodiments of the present disclosure, a top edge of the first narrow end 31b has a width w6 not greater than 400 nanometers; and/or the width w4 of the covering layer 104 at the second end face is not less than 1 micron and not greater than 20 microns. The specific structural size of the spot-size converter 100 may be specifically designed according to performance requirements of the device in combination with experience, which is not specifically limited in the present disclosure.

A part of the covering layer 104 and a part of the isolation layer 102 that are close to the second end face 100*b* jointly form a second waveguide 42 with a lower refractive index. One end of the covering layer 104 needs to extend to the second end face 100*b*, and the other end thereof needs to extend to cover at least the second equal-width portion 321, that is, to extend to at least the end of the second equal-width portion 321 away from the second end face 100*b*. The specific shape design of the covering layer 104 is not limited. Adjusting the shape and size of the covering layer 104 is to adjust the structural size of the second waveguide 42, and then to adjust the size of the spot size of the second end face 100*b*. Therefore, the shape and size of the covering layer 104 can be flexibly modulated as required, so as to achieve the best matching with the spot size of the optical fiber.

In some embodiments of the present disclosure, the covering layer 104 is of an axisymmetric structure with respect to a symmetry axis, and the covering layer 104 extends to cover at least an end of the third gradually-widening portion 322 away from the second end face 100*b*, so as to fully achieve its function in the second waveguide 42 and reduce the escape loss of light. The embodiments of the present disclosure are not limited to designing the covering layer as an axisymmetric structure, and the covering layer may also be of an asymmetric structure.

As shown in FIG. 3, in some embodiments, the covering layer 104 is of an axisymmetric structure with respect to the symmetry axis, and the covering layer 104 extends to cover at least the end of the third gradually-widening portion 322 away from the second end face 100*b*, an orthographic projection of the covering layer 104 on the substrate 101 is rectangular, and the width of the covering layer 104 (equal to the width w4 of the covering layer 104 at the second end face) is greater than the width w3 of the third equal-width portion 313. Similarly, in these embodiments, the covering layer may also be of an asymmetric structure. By the orthographic projection of the covering layer 104 on the substrate 101 being rectangular, it is meant that a contour of the orthographic projection on the substrate 101 is rectangular, and a side wall of the covering layer 104 may be perpendicular to or form other included angles with the substrate 101.

Figure 4:
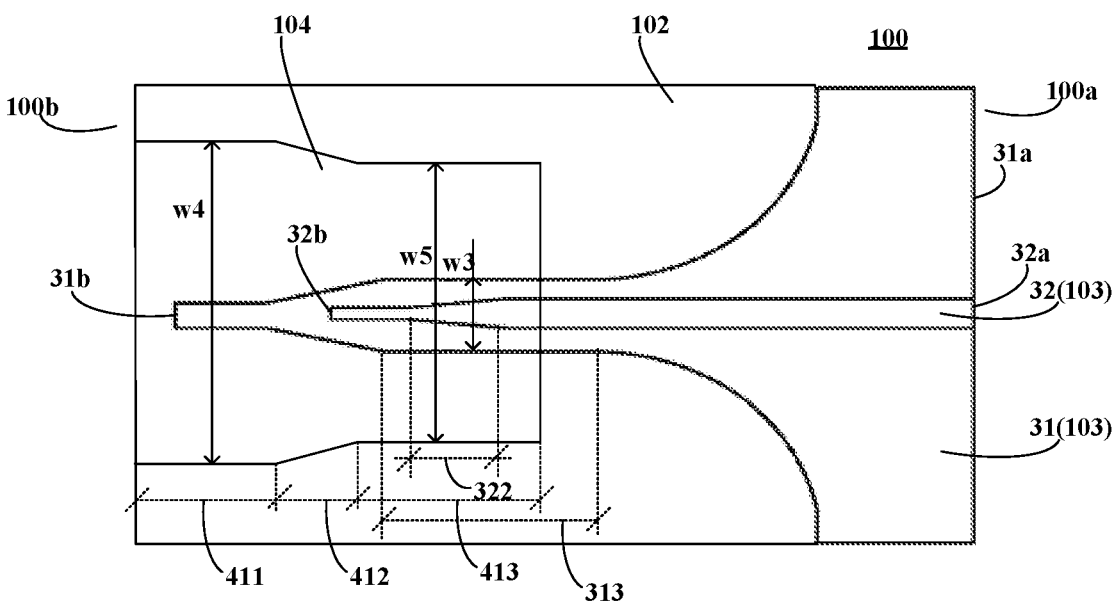
FIG. 4 is a schematic structural top view of a spot-size converter according to still some other example embodiments of the present disclosure.

As shown in FIG. 4, in some other embodiments, the covering layer 104 is of an axisymmetric structure with respect to the symmetry axis, and the covering layer 104 extends to cover at least the end of the third gradually-widening portion 322 away from the second end face 100*b*, the covering layer 104 comprises an eighth equal-width portion 411, a tapered portion 412 and a ninth equal-width portion 413 which are sequentially arranged in the direction away from the second end face 100*b*. The tapered portion 412 has a width gradually decreasing in the direction away from the second end face 100*b*, and the ninth equal-width portion 413 has a width w5 greater than the width w3 of the third equal-width portion 313. Obviously, the width of the eighth equal-width portion 411 (equal to the width w4 of the covering layer 104 at the second end face) is also greater than the width w3 of the third equal-width portion 313. Similarly, in these embodiments, the covering layer may also be of an asymmetric structure, for example, have a gradient change only on a single side.

In addition, the covering layer may also be designed to cover the entire first waveguide. For example, the covering layer further comprises a tenth portion located on a side of the ninth equal-width portion away from the second end face, and the tenth portion has a width greater than that of the ninth equal-width portion. In a specific embodiment, on the side of the ninth equal-width portion away from the second end face, the width of the covering layer increases in a gradient, so as to cover the entire first waveguide.

In this design, the width of the covering layer 104 increases in a gradient in the direction away from the first end face 100*a*, which is opposite to the width variation trend of the flat-plate layer 31 and the ridge layer 32 of the first waveguide 103. This design is equivalent to the increased size of the second waveguide 42. When light is transmitted from the first end face 100*a* to the second end face 100*b* of the spot-size converter 100, more light escaping from the first waveguide 103 can enter the second waveguide 42 and be moderately modulated in spot size by a gradient structure of the second waveguide 42, so as to reduce the light loss. When the light is transmitted from the second end face 100*b* to the first end face 100*a* of the spot-size converter 100, more light can enter the second waveguide 42 and be moderately modulated in spot size by the gradient structure of the second waveguide 42, and then enter the first waveguide 103. Therefore, the shape design of the covering layer 104 can further improve the coupling efficiency between the integrated optical waveguide and the optical fiber.

Figure 5:
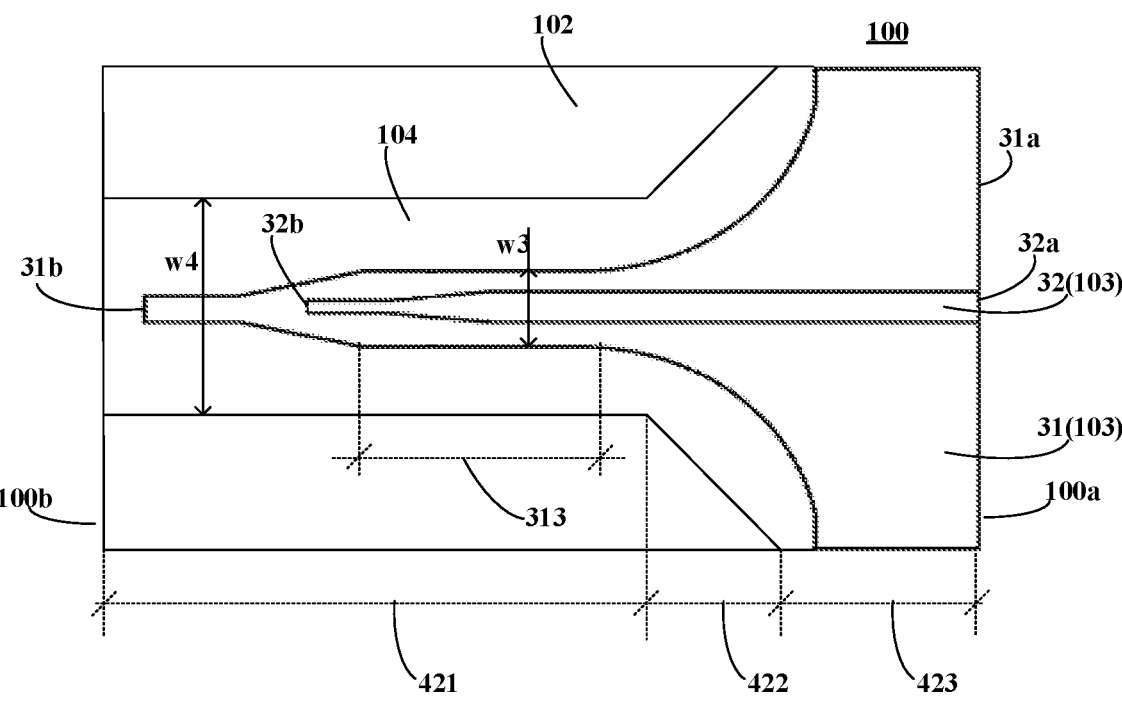
FIG. 5 is a schematic structural top view of a spot-size converter according to yet some other example embodiments of the present disclosure.

As shown in FIG. 5, in still some other embodiments, the covering layer 104 covers the entire first waveguide 103 and is of an axisymmetric structure with respect to the symmetry axis, and the covering layer 104 has a width increasing in a gradient in the direction away from the second end face 100*b*. The covering layer 104 comprises a sixth equal-width portion 421, a fourth gradually-widening portion 422 and a seventh equal-width portion 423 which are sequentially arranged in the direction away from the second end face 100*b*. The sixth equal-width portion 421 has a width (equal to the width w4 of the covering layer 104 at the second end face) greater than the width w3 of the third equal-width portion 313, and the fourth gradually-widening portion 422 has a width gradually increasing in the direction away from the second end face 100*b*. Similarly, in these embodiments, the covering layer may also be of an asymmetric structure, for example, have a gradient change only on a single side.

Figures 6, 7:
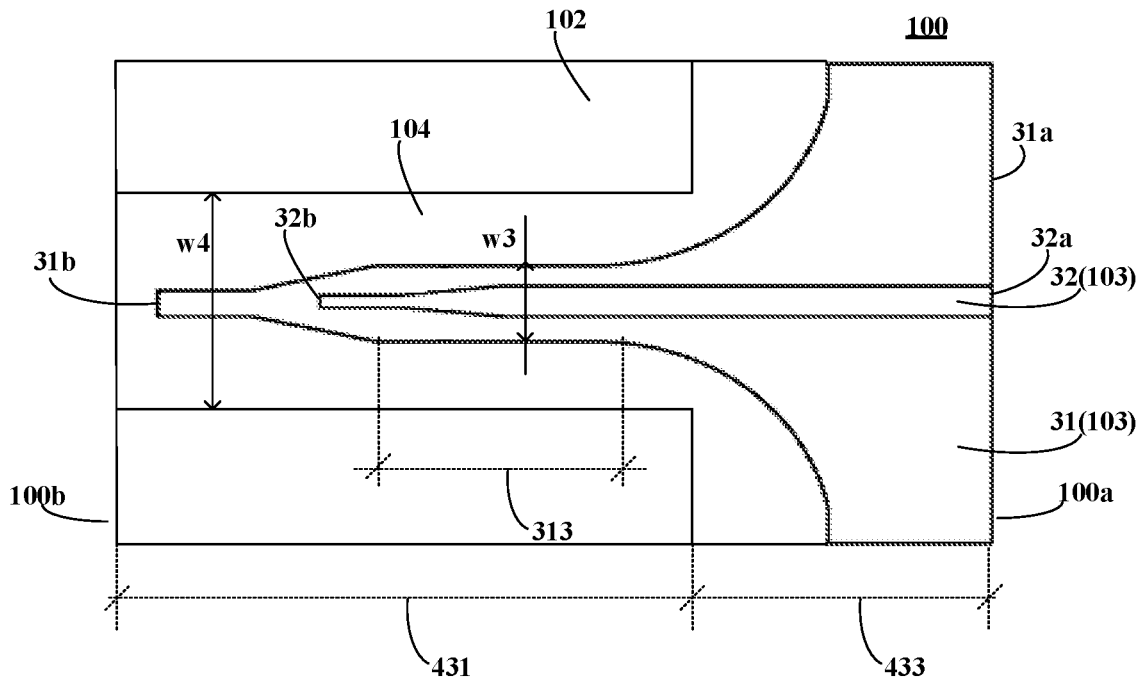
FIG. 6 is a schematic structural top view of a spot-size converter according to still yet some other example embodiments of the present disclosure.
FIG. 7 is a schematic structural diagram of a photonic device according to some example embodiments of the present disclosure.

As shown in FIG. 6, in yet some other embodiments, the covering layer 104 covers the entire first waveguide 103 and is of an axisymmetric structure with respect to the symmetry axis, and the covering layer 104 has a width increasing in a gradient in the direction away from the second end face 100*b*. The covering layer 104 comprises a sixth equal-width portion 431 and a seventh equal-width portion 433 which are sequentially arranged in the direction away from the second end face 100*b*. The sixth equal-width portion 431 has a width (equal to the width w4 of the covering layer 104 at the second end face) greater than the width w3 of the third equal-width portion 313. Similarly, in these embodiments, the covering layer may also be of an asymmetric structure, for example, have a gradient change only on a single side.

As shown in FIG. 7, an embodiment of the present disclosure further provides a photonic device 1, comprising a spot-size converter 100 according to any one of the aforementioned embodiments. The specific product type of the photonic device 1 is not limited, for example, it may be an electro-optical modulator, a splitter, a star coupler, a variable optical attenuator (VOA), an optical switch, an interleaver, an array waveguide grating (AWG), and the like.

The spot-size converter 100 is integrated in the photonic device 1. Since the spot-size converter 100 has a higher coupling efficiency, the optical loss of the photonic device 1 is smaller and the performance is improved.

It should be understood that, in this description, the orientations or positional relationships or dimensions denoted by the terms, such as "center", "longitudinal", "transverse", "length", "width", "thickness", "upper", "lower", "front", "rear", "left", "right", "vertical", "horizontal", "top", "bottom", "inner", "outer", "clockwise", "counterclockwise", "axial", "radial" and "circumferential", are the orientations or positional relationships or dimensions shown on the basis of the accompanying drawings, and these terms are used merely for ease of description, rather than indicating or implying that the apparatus or element referred to must have particular orientations and be constructed and operated in the particular orientations, and therefore should not be construed as limiting the scope of protection of the present disclosure.

In addition, the terms "first", "second" and "third" are merely for descriptive purposes and should not be construed as indicating or implying relative importance or implicitly indicating the number of technical features indicated. Thus, the features defined with "first", "second" and "third" may explicitly or implicitly comprise one or more features. In the description of the present disclosure, the term "a plurality of" means two or more, unless otherwise explicitly and specifically defined.

In the present disclosure, unless expressly stated or defined otherwise, the terms such as "mounting", "connection", "connected" and "fixing" should be interpreted broadly, for example, they may be a fixed connection, a detachable connection, or an integrated connection; may be mechanical connection, or electrical connection, or communication; and may be a direct connection or an indirect connection by means of an intermediate medium, or may be internal communication between two elements or interaction between the two elements. For those of ordinary skill in the art, the specific meanings of the above terms in the present disclosure can be understood according to specific circumstances.

In the present disclosure, unless expressly stated or limited otherwise, the expression of the first feature being "above" or "below" the second feature may comprise the case that the first feature is in direct contact with the second feature, and may also comprise the case that the first feature and the second feature are not in direct contact but are contacted via another feature therebetween. Furthermore, the first feature being "over", "above" or "on" the second feature comprises the case that the first feature is directly or obliquely above the second feature, or merely indicates that the first feature is at a higher level than the second feature. The first feature being "below", "under" or "beneath" the second feature comprises the case that the first feature is directly or obliquely below the second feature, or merely indicates that the first feature is at a lower level than the second feature.

This description provides many different implementations or examples that can be used to implement the present disclosure. It should be understood that these different implementations or examples are purely illustrative and are not intended to limit the scope of protection of the present disclosure in any way. On the basis of the disclosure of the description of the present disclosure, those skilled in the art will be able to conceive of various changes or substitutions.

All these changes or substitutions shall fall within the scope of protection of the present disclosure. Therefore, the scope of protection of the present disclosure shall be subject to the scope of protection of the claims.

What is claimed is:

1. A spot-size converter, comprising:
a first end face configured to be coupled to an integrated optical waveguide;
a second end face parallel to the first end face and configured to be coupled to an optical fiber;
a substrate;
an isolation layer located on a side of the substrate, wherein the isolation layer has an orthographic projection on the substrate that substantially coincides with the substrate;
a first waveguide located on a side of the isolation layer away from the substrate, and comprising:
a flat-plate layer comprising a first wide end extending to the first end face and a first narrow end, wherein the first narrow end extends to the second end face or has a distance from the second end face, wherein the flat-plate layer has a width in a width direction which decreases in a gradient from the first wide end to the first narrow end, and wherein the flat-plate layer comprises a first equal-width portion adjacent to the first narrow end, wherein the width direction is parallel to the substrate and parallel to the first end face; and
a ridge layer stacked on a side of the flat-plate layer away from the substrate, the ridge layer comprising a second wide end extending to the first end face and a second narrow end having a distance from the first narrow end, the ridge layer having a width which decreases in a gradient from the second wide end to the second narrow end, and wherein the ridge layer comprises a second equal-width portion adjacent to the second narrow end; and
a covering layer located on a side of the first waveguide away from the substrate, wherein the covering layer extends to the second end face, and the covering layer extends to cover at least an end of the second equal-width portion away from the second end face, wherein a part of the covering layer close to the second end face and a part of the isolation layer close to the second end face form a second waveguide,
wherein the flat-plate layer comprises the first equal-width portion, a first gradually-widening portion, a third equal-width portion, a second gradually-widening portion, and a fourth equal-width portion, wherein the first equal-width portion, the first gradually-widening portion, the third equal-width portion, the second gradually-widening portion, and the fourth equal-width portion are sequentially arranged in a direction away from the first narrow end, and the ridge layer comprises the second equal-width portion, a third gradually-widening portion and a fifth equal-width portion, wherein the second equal-width portion, the third gradually-widening portion, and the fifth equal-width portion are sequentially arranged in a direction away from the second narrow end, wherein each of the first gradually-widening portion, the second gradually-widening portion, and the third gradually-widening portion has a width gradually increasing in a direction away from the second end face.

2. The spot-size converter according to claim 1, wherein the covering layer extends to cover at least an end of the third gradually-widening portion away from the second end face.

3. The spot-size converter according to claim 2, wherein an orthographic projection of the covering layer on the substrate is rectangular, and the width of the covering layer is greater than that of the third equal-width portion.

4. The spot-size converter according to claim 2, wherein the covering layer covers the entire first waveguide, and the covering layer has a width increasing in a gradient in the direction away from the second end face; and the covering layer comprises a sixth equal-width portion, a fourth gradually-widening portion, and a seventh equal-width portion, wherein the sixth equal-width portion, the fourth gradually-widening portion, and the seventh equal-width portion are sequentially arranged in the direction away from the second end face, wherein the fourth gradually-widening portion has a width gradually increasing in the direction away from the second end face, and the sixth equal-width portion has a width greater than that of the third equal-width portion.

5. The spot-size converter according to claim 2, wherein the covering layer covers the entire first waveguide, and the covering layer has a width increasing in a gradient in the direction away from the second end face; and the covering layer comprises a sixth equal-width portion and a seventh equal-width portion, wherein the sixth equal-width portion and the seventh equal-width portion are sequentially arranged in the direction away from the second end face, and the sixth equal-width portion has a width greater than that of the third equal-width portion.

6. The spot-size converter according to claim 2, wherein the covering layer comprises an eighth equal-width portion, a tapered portion, and a ninth equal-width portion, wherein the eighth equal-width portion, the tapered portion, and the ninth equal-width portion are sequentially arranged in the direction away from the second end face, wherein the tapered portion has a width gradually decreasing in the direction away from the second end face, and the ninth equal-width portion has a width greater than that of the third equal-width portion.

7. The spot-size converter according to claim 6, wherein the covering layer covers the entire first waveguide, the covering layer further comprises a tenth portion located on a side of the ninth equal-width portion away from the second end face, and the tenth portion has a width greater than that of the ninth equal-width portion.

8. The spot-size converter according to claim 1, wherein the spot-size converter further comprises a first side surface and a second side surface, wherein the first side surface and the second side surface are arranged in parallel to each other and intersect with the first end face and the second end face, wherein the fourth equal-width portion extends to the first side surface and the second side surface.

9. The spot-size converter according to claim 1, wherein a top edge of the first narrow end has a width not greater than 400 nanometers.

10. The spot-size converter according to claim 1, wherein the width of the covering layer at the second end face is not less than 1 micron and not greater than 20 microns.

11. The spot-size converter according to claim 1, wherein in the direction away from the second end face, the widths of the first gradually-widening portion and the third gradually-widening portion increase linearly and gradually, and the width of the second gradually-widening portion increases nonlinearly and gradually.

12. The spot-size converter according to claim 1, wherein the first equal-width portion is prismatic and has a triangular or trapezoidal cross section parallel to the first end face.

13. The spot-size converter according to claim 1, wherein the second equal-width portion is prismatic and has a triangular or trapezoidal cross section parallel to the first end face.

14. The spot-size converter according to claim 1, wherein the first end face is an input end of the spot-size converter, and the second end face is an output end of the spot-size converter; or the second end face is an input end of the spot-size converter, and the first end face is an output end of the spot-size converter.

15. A photonic device, comprising a spot-size converter, wherein the spot-size converter comprises:

a first end face configured to be coupled to an integrated optical waveguide;

a second end face parallel to the first end face and configured to be coupled to an optical fiber;

a substrate;

an isolation layer located on a side of the substrate, wherein the isolation layer has an orthographic projection on the substrate that substantially coincides with the substrate;

a first waveguide located on a side of the isolation layer away from the substrate, and comprising:

a flat-plate layer comprising a first wide end extending to the first end face and a first narrow end, wherein the first narrow end extends to the second end face or has a distance from the second end face, wherein the flat-plate layer has a width in a width direction which decreases in a gradient from the first wide end to the first narrow end, and wherein the flat-plate layer comprises a first equal-width portion adjacent to the first narrow end, wherein the width direction is parallel to the substrate and parallel to the first end face; and a ridge layer stacked on a side of the flat-plate layer away from the substrate, the ridge layer comprising a second wide end extending to the first end face and a second narrow end having a distance from the first narrow end, the ridge layer having a width which decreases in a gradient from the second wide end to the second narrow end, and wherein the ridge layer comprises a second equal-width portion adjacent to the second narrow end; and a covering layer located on a side of the first waveguide away from the substrate, wherein the covering layer extends to the second end face, and the covering layer extends to cover at least an end of the second equal-width portion away from the second end face, wherein a part of the covering layer close to the second end face and a part of the isolation layer close to the second end face form a second waveguide, wherein the flat-plate layer comprises the first equal-width portion, a first gradually-widening portion, a third equal-width portion, a second gradually-widening portion, and a fourth equal-width portion, wherein the first equal-width portion, the first gradually-widening portion, the third equal-width portion, the second gradually-widening portion, and the fourth equal-width portion are sequentially arranged in a direction away from the first narrow end, and the ridge layer comprises the second equal-width portion, a third gradually-widening portion and a fifth equal-width portion, wherein the second equal-width portion, the third gradually-widening portion, and the fifth equal-width portion are sequentially arranged in a direction away from the second narrow end, wherein each of the first gradually-widening portion, the second gradually-widening portion, and the third gradually-widening portion has a width gradually increasing in a direction away from the second end face.

16. The photonic device according to claim 15, wherein the covering layer extends to cover at least an end of the third gradually-widening portion away from the second end face.

17. The photonic device according to claim 16, wherein an orthographic projection of the covering layer on the substrate is rectangular, and the width of the covering layer is greater than that of the third equal-width portion.

18. The photonic device according to claim 16, wherein the covering layer covers the entire first waveguide, and the covering layer has a width increasing in a gradient in the direction away from the second end face; and the covering layer comprises a sixth equal-width portion, a fourth gradually-widening portion, and a seventh equal-width portion, wherein the sixth equal-width portion, the fourth gradually-widening portion, and the seventh equal-width portion are sequentially arranged in the direction away from the second end face, wherein the fourth gradually-widening portion has a width gradually increasing in the direction away from the second end face, and the sixth equal-width portion has a width greater than that of the third equal-width portion.

19. The photonic device according to claim 16, wherein the covering layer covers the entire first waveguide, and the covering layer has a width increasing in a gradient in the direction away from the second end face; and the covering layer comprises a sixth equal-width portion and a seventh equal-width portion, wherein the sixth equal-width portion and the seventh equal-width portion are sequentially arranged in the direction away from the second end face, and the sixth equal-width portion has a width greater than that of the third equal-width portion.

20. The photonic device according to claim 16, wherein the covering layer comprises an eighth equal-width portion, a tapered portion, and a ninth equal-width portion, wherein the eighth equal-width portion, the tapered portion, and the ninth equal-width portion are sequentially arranged in the direction away from the second end face, wherein the tapered portion has a width gradually decreasing in the direction away from the second end face, and the ninth equal-width portion has a width greater than that of the third equal-width portion.

* * * * *